United States Patent
Edwards et al.

(10) Patent No.: US 11,057,649 B1
(45) Date of Patent: *Jul. 6, 2021

(54) LIVE VIDEO STREAMING BASED ON AN ENVIRONMENT-RELATED TRIGGER

(71) Applicant: Capital One Services, LLC, McLean, VA (US)

(72) Inventors: Joshua Edwards, McLean, VA (US); Michael Saia, McLean, VA (US); Tyler Maiman, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/880,955

(22) Filed: May 21, 2020

Related U.S. Application Data (63) Continuation of application No. 16/736,446, filed on Jan. 7, 2020, now Pat. No. 10,750,209.

(51) Int. Cl.
H04N 7/18 (2006.01)
H04N 21/2187 (2011.01)
G06K 9/00 (2006.01)

(52) U.S. Cl.
CPC ..... *H04N 21/2187* (2013.01); *G06K 9/00771* (2013.01); *H04N 7/183* (2013.01)

(58) Field of Classification Search
CPC . H04N 21/2187; H04N 7/183; G06K 9/00771
USPC .......................................................... 348/150
See application file for complete search history.

*Primary Examiner* — Nguyen T Truong
(74) *Attorney, Agent, or Firm* — Pillsbury Winthrop Shaw Pittman LLP (57) ABSTRACT

In certain embodiments, streaming of a live video to trigger-associated recipients in response to triggers in an environment may be facilitated. In some embodiments, one or more triggers may be detected in an environment, and one or more actions associated with the detected triggers may be performed. As an example, where such associated actions include streaming a live video of the environment to one or more recipients, the recipients may be selected as candidates to receive the live video stream based on the recipients being part of a recipient list associated with a detected trigger. In some embodiments, although a first recipient of the recipient list may initially be selected to receive the live video stream, the live video may be streamed to a second recipient of the recipient list based on the first recipient being unavailable to receive the live video stream.

20 Claims, 4 Drawing Sheets

LIVE VIDEO STREAMING BASED ON AN ENVIRONMENT-RELATED TRIGGER

CROSS-REFERENCE TO RELATED APPLICATION(S)

This application is a continuation of U.S. patent application Ser. No. 16/736,446, filed on Jan. 7, 2020. The content of the foregoing application is incorporated herein in its entirety by reference.

FIELD OF THE INVENTION

The invention relates to environment-related triggering of a live video stream, including, for example, providing the live video stream to one or more recipients based on the triggering and the recipients' characteristics, such as a recipient's priority or category.

BACKGROUND OF THE INVENTION

Advances in network and streaming technologies have enabled users to stream video content to other users across a global landscape. Despite such advancements, typical video streaming applications and services often face a number of technical issues, including high bandwidth usage (e.g., due to the bandwidth requirements of video streaming), poor user experience (e.g., due to excessive notifications), issues related to security or privacy, etc. As an example, where live videos are unnecessarily streamed to a large set of users, a streaming service may face substantial network resource costs. Additionally, or alternatively, even when users voluntarily agree to automatically receive video streams or related prompts (e.g., motion alerts, prompts to accept automated video stream, etc.), they may be inundated with excessive amounts of such prompts, thereby creating a negative experience for the users. These and other drawbacks exist.

SUMMARY OF THE INVENTION

Aspects of the invention relate to methods, apparatuses, and/or systems for facilitating streaming of live video of an environment to one or more recipients via monitoring of the environment for the occurrence of triggers.

In some embodiments, one or more triggers may be detected by a user device (e.g., based on a live video stream, sensor information, etc.) in an environment in which the user device is located. Based on the detection, one or more recipients may be selected. In some embodiments, the recipients may be associated with a characteristic, such as a priority or category. Based on the trigger and the associated characteristic, one or more recipients may be selected to receive a live video stream of the environment acquired by the user device. The association of the recipient with a characteristic may be assigned to the recipient by the user of the user device. Based on each recipient's priority, the live video stream may be provided to the recipients of the recipient set in order of highest to lowest priority. In some embodiments, if a selected recipient is unavailable to receive the video stream in real time, the video stream may be provided to the recipient with the next highest priority in the recipient set. In this way, by selecting a particular set of recipients as candidates for receiving the live video stream (as opposed to all possible recipients associated with the user), a streaming service may limit its network resource usage. Moreover, the streaming service further reduces its network resource usage because the live video is not streamed to one or more recipients of the recipient set until it is determined that one or more other recipients having higher priority are unavailable to receive the live video stream. Additionally, or alternatively, in circumstances where it is sufficient for a subset of the recipient set to receive the live video stream, the streaming service may decrease the amount of disturbance to one or more recipients by avoiding streaming of the live video to certain recipients (e.g., recipients with lower priority) when other recipients (e.g., recipients with higher priority) are available to receive the live video stream.

In some embodiments, training information may be provided as input to a prediction model to generate predictions related to triggers detected in the environment. As an example, the training information may indicate triggers that the user device detects in the environment (e.g., a temperature change, a voice profile, a person, images or sounds, landmarks or other characteristics of the environment.). In some embodiments, trigger information may be provided as reference feedback to the prediction model. As an example, the trigger information may be related to occurrences in the environment (e.g., information indicating a change in temperature, information indicating a person or a landmark, information indicating a voice or sound, information indicating a motion, etc.). As another example, the prediction model may update one or more portions of the prediction model based on the predictions and the trigger information. Subsequent to the updating of the prediction model, the prediction model may be used to process information related to triggers detected by user device in the environment to determine what recipients should receive the stream of the live action or what other actions are to be performed based on the trigger.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
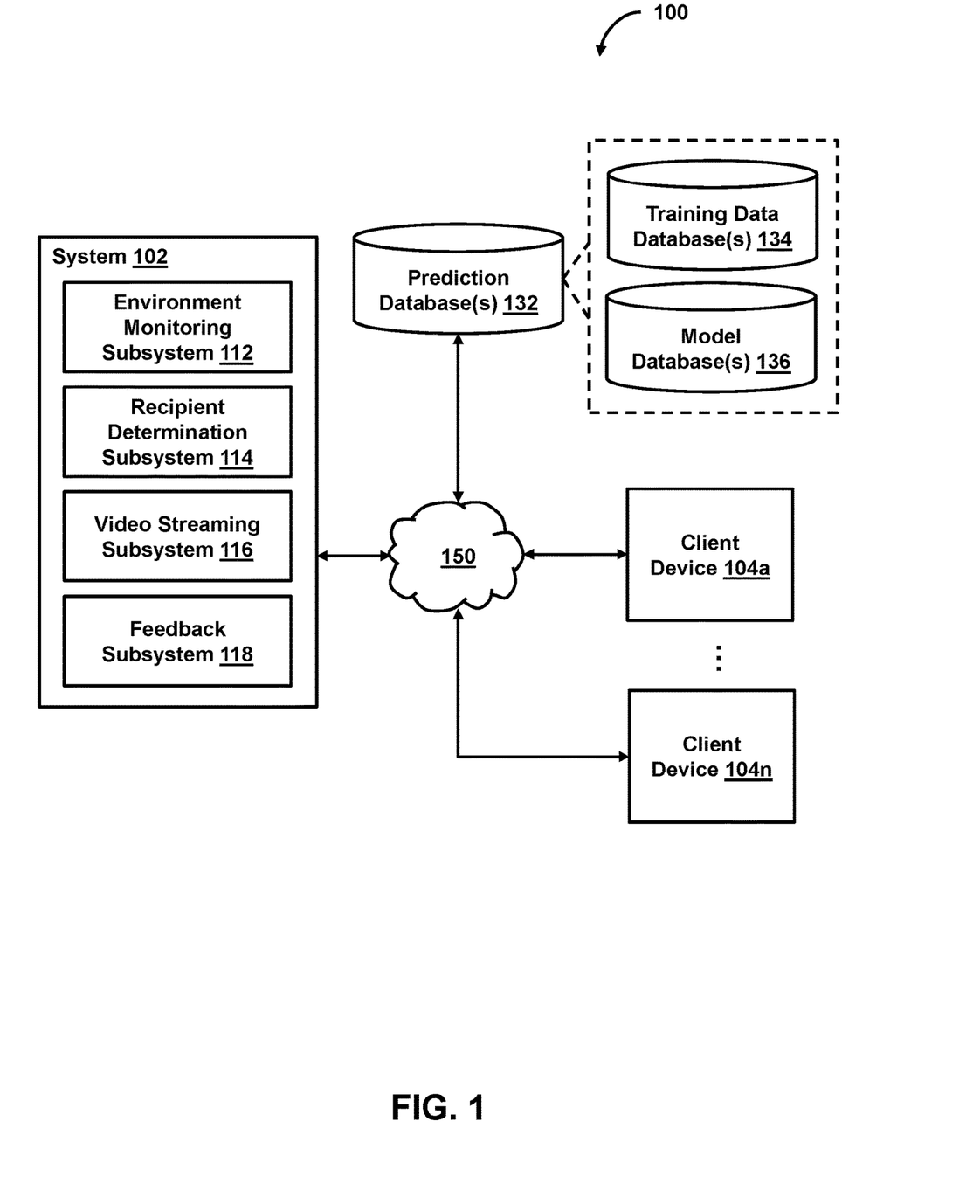
FIG. 1 shows a system for facilitating a live video stream to one or more recipients, in accordance with one or more embodiments.

FIG. 1 shows a system 100 for facilitating the provision of a live video stream to one or more recipients based on detection of one or more triggers in an environment, in accordance with one or more embodiments. As shown in FIG. 1, system 100 may include computer system 102, client device 104 (or client devices 104a-104n), or other components. Computer system 102 may include environment monitoring subsystem 112, recipient determination subsystem 114, video streaming subsystem 116, feedback subsystem 118, or other components. Each client device 104 may include any type of wearable device, mobile terminal, fixed terminal, or other device. By way of example, client device 104 may include a headset, glasses, a watch, a smartphone, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine-learning model and a non-statistical model replacing a non-machine-learning model in one or more embodiments).

In some embodiments, system 100 may cause a live video to be streamed to a recipient in response to a trigger in an environment. In some embodiments, one or more triggers may be detected in an environment, and one or more actions associated with the detected triggers may be performed. As an example, where such associated actions include streaming a live video of the environment to one or more recipients, system 100 may select the recipients as candidates to receive the live video stream based on the recipients being part of a recipient list associated with a detected trigger. In some embodiments, system 100 may initiate streaming of the live video to a first recipient of the recipient list, but may determine that the first recipient is unavailable to receive the live video. System 100 may then stream the live video to a second recipient of the recipient list based on the first recipient being unavailable to receive the live video stream. As an example, the first recipient may be initially selected to receive the live video stream over the second recipient based on the first recipient having a higher priority than the second recipient. As a further example, the second recipient may subsequently be selected to receive the live video stream over one or more other recipients in the recipient list based on the second recipient having a higher priority than the other recipients. In this way, as discussed above, system 100 may significantly reduce bandwidth or other network resource usage and/or decrease the amount of disturbance to one or more potential recipients.

Subsystems 112-118

In some embodiments, environment monitoring subsystem 112 may acquire a live video via a user device (e.g., glasses, a headset, a watch, a smartphone, or other user device). The live video may be streamed in real time to one or more recipients based on information derived from triggers detected in an environment. In some embodiments, the environment monitoring subsystem 112 may monitor the environment, in which the device is located. For example, the environment monitoring subsystem 112 may monitor the environment for one or more triggers (e.g., based on a live video stream, sensor information, etc.). In some embodiments, such triggers may include a person, a voice print, speech pattern, landmarks, temperature, motion, or light. As an example, the environment monitoring subsystem 112 may monitor the environment for information related to triggers and determine, based on the monitoring of the environment, the occurrence of the trigger in the environment. For example, when a change in temperature occurs in the environment, that temperature change may be detected to be a trigger that causes the live video to be provided to a recipient.

In some embodiments, recipient determination subsystem 114 may select one or more recipient sets as candidates to receive a live video stream of the environment, based on the detection of a trigger in the environment. As an example, information related to the recipient set (e.g., characteristics of the recipient set) may be obtained. Based on the obtained information, a set may be caused to be selected as candidates for receiving the live video stream. In some embodiments, the information related to the sets of recipients may include information related to characteristics of the recipients, such as a priority, a category, a trait, or other information. In some embodiments, a particular priority may be a characteristic that a particular recipient set may be associated with. For example, a recipient set may be selected to receive the live video stream based on the recipient set's priority being higher than that of at least one or more other sets of recipients. Based on the set's priority, a live video stream of the environment may be provided to one or more recipients of the selected set. In some embodiments, the recipient set may be associated with the trigger. As an example, the sets of recipients may be associated by the user of the device with one or more triggers (e.g., a list of recipients being associated with a change in temperature of over five degrees). Recipient determination subsystem 114 may perform the foregoing determination of the set based on such trigger association information. The live video stream may then be provided to the recipients of the selected set associated with a change in temperature of over five degrees being detected as a trigger in the environment.

In some embodiments, recipient determination subsystem 114 may select the recipients based on the detection of a trigger in the environment. As an example, recipient determination subsystem 114 may obtain information related to the recipients and determine, based on the obtained information, at least one recipient of the set for selection as a candidate for receiving the live video stream of the environment. In some embodiments, the information related to the recipient may include one or more of a priority, a category, or other characteristics of the recipient. For example, a particular recipient may be associated with a particular priority. For example, the recipient having a priority may be selected to receive the live video stream based on the recipient's priority being higher than the priority of at least one or more other recipients of the recipient set, or the recipient's priority exceeding a priority threshold. In a further example, a particular recipient may be associated with a category such as "family members." The recipient may be selected to receive the live video stream based on the recipient's being categorized as a "family member" due to the recipient's being the spouse of the user of the device. As such, a recipient will be contacted based on its characteristic (e.g., priority, category, etc.) and will not be unnecessarily disturbed to receive the live video stream if the recipient does not have that characteristic.

Figure 2:
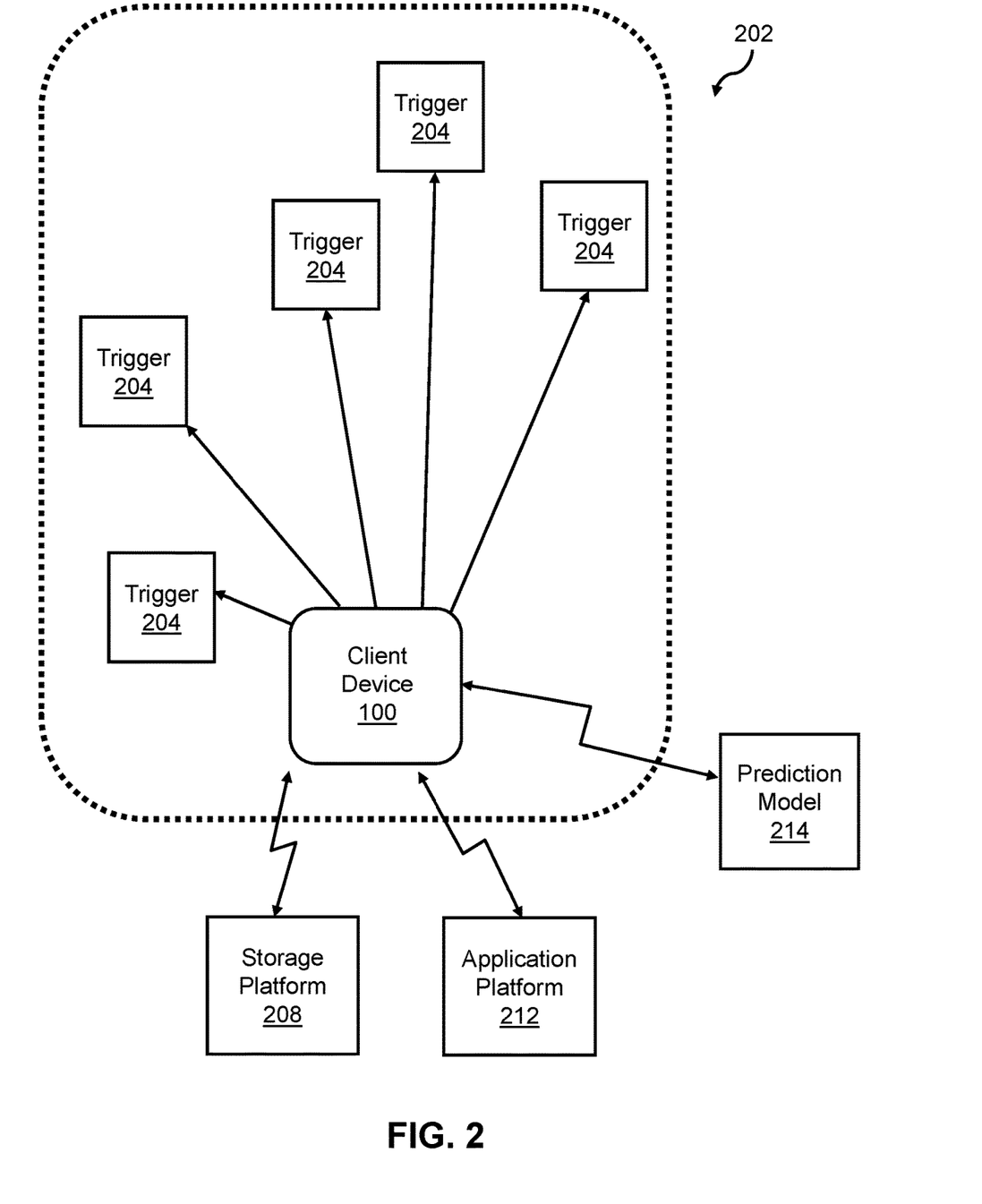
FIG. 2 shows a device configured to facilitate a live video stream of an environment to one or more recipients, in accordance with one or more embodiments.

In some embodiments, a recipient may be directly associated with the trigger. As an example, a recipient may be associated by the user of the device with one or more triggers. For example, a recipient (e.g., a security company) may be associated with objects that indicate danger to the user, such as firearms, knives, or other weaponry (e.g., recognizing firearms, knives, or other weaponry via image recognition processing). Recipient determination subsystem 114 may perform the foregoing determination based on such trigger association information. Based on the determination of one or more recipients, the live video stream may then be provided to the recipient (e.g., by video streaming subsystem 116 to storage platform 208).

In some embodiments, if a recipient that was selected to receive the live video stream is unavailable to receive the stream, at least one additional recipient with the next highest priority may be further selected by the recipient determination subsystem 114 to receive the live video stream. As an example, the recipient may be determined to be unavailable if the recipient has snoozed such streaming alerts or otherwise indicated that such streaming should not be presented (e.g., a device-wide do-not-disturb option is currently set, the recipient has rejected the stream, etc.). As another example, the recipient may be determined to be unavailable if the recipient is detected to be away from a device from which the live video is to be streamed (e.g., based on GPS or other location information indicating a location of the recipient, based on camera or proximity sensors on the device indicating that the user is not near the device, etc.). As another example, the recipient may be determined to be unavailable if the recipient is detected to be driving or in other circumstances in which the recipient is to be deemed unavailable (e.g., based on accelerometer or other sensor information indicating such circumstances).

In some embodiments, the video stream may be stored for the recipient that initially failed to receive the live video stream by the recipient determination subsystem 114. In some embodiments, the live video stream may be provided to recipients and stored via the video streaming subsystem 116. In some embodiments, the recipient determination subsystem 114 may cycle through the recipient set, based on greatest priority to least priority, to select at least one recipient that is available to receive the live video stream. In some embodiments, if none of the recipients may receive the live video stream, an additional recipient set may be selected to receive the live video stream, and the live video stream may be provided to the recipients of the additional recipient set. Therefore, in scenarios in which a live video stream may not be received by a recipient (e.g., if the recipient is unavailable or not located near a device that may receive the live video stream), the live video stream may be provided to other selected recipients until at least one recipient receives the live video stream, thereby ensuring that the live video stream will be viewed by at least one recipient.

In some embodiments, feedback subsystem 118 may train or configure a prediction model 214 to facilitate detection of triggers based on information from the environment in which the device is located. In some embodiments, feedback subsystem 118 may obtain information related to triggers from monitoring the environment (e.g., via sensors or the live video representative of the environment) and provide such information provided as input to a prediction model to generate predictions (e.g., predictions related to the occurrence of a trigger in the environment). As an example, the obtained information may include information indicating triggers that are detected in the environment in which the device is located (e.g., via sensors). As another example, the obtained information indicating triggers may correspond to images (e.g., images from image recognition) or audio (e.g., speech from speech recognition) from the video acquired in real time of the environment viewed by the device. For example, information indicating triggers may include images or audio that are related to a hostile person, or dangerous objects such as a firearm or knife, a view of a landmark, or a specific utterance. In some embodiments, the obtained information is provided by the user, such as a picture or recording of a hostile person known to the user. Feedback subsystem 118 may provide trigger information as reference feedback to the prediction model, and the prediction model may update one or more portions of the prediction model based on the predictions and the trigger information. As an example, the trigger information may be related to detection of the trigger by the device (e.g., information indicating the occurrence of a trigger in the environment such as video or sensing information, etc.). In this way, for example, the prediction model may be trained or configured to generate more accurate predictions.

As such, in some embodiments, subsequent to the updating of the prediction model, recipient determination subsystem 114 may use the prediction model to select one or more sets of recipients or recipients of a set of recipients. As an example, system 100 may obtain and provide information related to triggers to the prediction model to obtain one or more predictions from the prediction model. Based on the predictions from the prediction model, lists of recipients or recipients of a recipient set may be determined to be suitable candidates to receive a live video stream. In one use case, the prediction model may generate a prediction based on information related to a specific trigger of a particular recipient or recipient set should be selected as candidates to receive the live video stream. For example, a prediction of a recipient set that includes law enforcement agencies may be generated based on information related to dangerous objects (e.g., a firearm or knife) detected as triggers. In another use case, the prediction model may generate a prediction of a characteristic common to recipients that the live video may be provided to (e.g., providing the live video stream to all recipients with a particular characteristic, such as priority, category, trait, etc. shared by the recipients), based on the trigger. For example, a prediction of a recipient set characterized as "family members" may be generated based on a particular family member (e.g., a child) being detected as a trigger.

In some embodiments, the prediction model may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

As an example, with respect to FIG. 2, a prediction model 214 may take inputs (e.g., information related to triggers in the environment) and provide outputs (e.g., prediction of triggers occurring in the environment, or recipients or recipient set to provide a live video stream based on the triggers detected in the environment). In one use case, outputs may be fed back to the machine learning model as input to train the machine learning model (e.g., alone or in conjunction with user indications of the accuracy of outputs, labels associated with the inputs, or with other reference feedback information). In another use case, prediction model 214 may update its configurations (e.g., weights, biases, or other parameters) based on its assessment of its prediction (e.g., predictions of triggers or recipients) and reference feedback information (e.g., user indication of accuracy, reference labels, or other information). In another use case, where the prediction model 214 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model may be trained to generate better predictions.

FIG. 2 depicts a client device 100 configured to facilitate a live video stream of an environment to one or more recipients, in accordance with one or more embodiments. In some embodiments, a client device 100 may be a user device (e.g., a headset, glasses, mobile device, or other device) that is located in an environment 202. In some embodiments, the user device may monitor the environment. For example, the user device may continuously view or sense the environment to acquire information related to triggers in the environment in real time. In some embodiments, a device may include a wearable device that is worn by a user in an environment. In some embodiments, the user device may be configured with a camera or sensor (e.g., optical sensors, heat sensors, motion sensors, acoustic sensors, etc.) to view or sense occurrences in the environment. For example, the user device may detect triggers 204 in the environment. In some embodiments, processing may be performed on information related to triggers that is acquired from the environment via viewing and sensing of the environment. In some embodiments, the user device may be a remotely operated or autonomous device, such as a robot or a vehicle. In some embodiments, the user device may obtain a live video of the environment. In some embodiments, other components aside from the user device may view or sense the environment to acquire information related to triggers in the environment.

In some embodiments, the environment 202 may be monitored for the occurrence of triggers. In some embodiments, information from sensing the environment (e.g., temperature, light, sound, images or other characteristics of the environment) may be used to detect triggers 204. In some embodiments, triggers may include a temperature change, brightness of the environment, a location, a person, an object, a landmark, utterances, volume of sounds, a speech pattern, a voice print, or other triggers. For example, a particular entity may be detected as a trigger, indicating that a hostile person is present in the environment (e.g., recognizing a face via facial recognition processing). In a further example, a change in temperature (e.g., increase in temperature of five degrees) may be sensed as a trigger, indicating that the user of the user device has entered a building that may be dangerous (e.g., moving from a cooler location to a warmer one). In a further example, an oral prompt from the user may be detected as a trigger (e.g., to begin or terminate monitoring the environment, recording a live video, streaming the live video to a recipient etc.). In some embodiments, the monitoring of the environment may be continuous or automatic, or prompted by a user of the user device.

In some embodiments, the environment may be monitored for the occurrence of triggers via viewing the environment via a live video that is representative of the environment. In some embodiments, the live video may include images and audio. For example, triggers may be detected from the images and audio of the live video. For example, image recognition or speech recognition may be performed on the images and audio to detect triggers. In one use case, a particular person depicted in the video may be detected as a trigger, where the particular person was designated as a hostile person. In another use case, triggers may include a speech pattern, a voice print, a voice pattern, utterances, volume of sounds, or other audio-related triggers. For example, a statement, "hands up!" may be detected as a trigger in the environment. The utterance of "hands up" may be associated with the user coming into contact with potentially hostile law enforcement. In some embodiments, the monitoring of the environment may be continuous or automatic. For example, the environment may be continually sensed, or the monitoring may automatically be activated when a requirement is met. For example, a user of the user device may prompt the monitoring of the environment to be active, via an oral command.

In some embodiments, a recipient set may be selected based on the detected trigger. For example, a detected trigger may be a firearm, which may indicate that the environment is dangerous. A recipient set may be selected, based on the firearm, to receive a stream of the live video depicting the dangerous situation. For example, the recipient set may include law enforcement agencies.

In some embodiments, particular triggers may be associated with particular recipient sets. For example, a trigger may be a particular entity, such as a cat, which may be associated with a particular set of recipients that include social media platforms and chat platforms. When the cat is detected in the environment, a stream of the live video featuring the cat may be provided to the social media platforms and chat platforms. Additionally, or alternatively, the recipient set may be selected based on a priority, category, or other characteristics associated with the recipient set. For example, a recipient set may be selected based on the set being categorized as a set of people who enjoy watching videos of cats. When a cat is detected, the set of cat-loving people may be selected based on the categorization.

In some embodiments, a recipient set may be selected based on a priority of the recipient set. For example, a particular recipient set may be associated with a particular priority, and the particular set may be selected based on the set having a priority higher than at least one of other recipient sets. In a further example, the particular set may be selected based on the set having a priority that exceeds a priority threshold. In some embodiments, a priority may be a numerical value. For example, if the trigger is detected to be a dangerous object such as a knife, a recipient set that are law enforcement agencies may be selected based on the priority of the set being the highest priority.

In some embodiments, individual recipients of the recipient set may be associated with one or more priorities. For example, a recipient (e.g., a law enforcement agency) may have a higher priority than at least one other recipient or other priority for a trigger that is detected to be a dangerous object or high risk entity (e.g., a firearm or a hostile person). The same recipient may also have a lower priority than at least one other recipient (e.g., a grandparent) for a trigger that is detected to be a low risk entity (e.g., a grandchild of the grandparent). In some embodiments, different triggers may be associated with different priorities for various recipient sets. For example, a first trigger (e.g., grandchild) may be associated with a first priority for a particular recipient set (e.g., grandparent), whereas a second trigger (e.g., the grandchild's puppy) may be associated with a second priority (e.g., lower than the first) for the same recipient set.

In some embodiments, a recipient set may be selected based on a characteristic of the recipient set. In some embodiments, certain characteristics of the set may be associated with certain triggers. For example, a particular recipient set may be associated with a particular characteristic associated with a trigger. When that trigger is detected in the environment, the particular set may be selected based on the set having the particular characteristic. In some embodiments, a characteristic may be a category, a designation, a trait, or other characteristic. For example, a recipient set may be associated with the characteristic of the recipients of the set being "family members." A particular family member, such as a particular baby, may be detected as a trigger. Based on the baby being detected in the environment, the "family members" set of recipients may be selected to receive a video stream featuring the baby.

In some embodiments, a recipient may be selected based on the detection of a trigger from monitoring the environment. For example, a recipient set (e.g., hospitals) may be associated with certain speech being detected as a trigger (e.g., recognizing variations on the statements "I can't breathe" or "my chest hurts."). One or more recipient may be selected from the set associated with the speech, such as a particular hospital with an ambulatory service that is located near where the user device is, compared to the other hospitals on the set. In a further example, a location of a particular apartment building may be detected as a trigger, and the user of the user device may be a real estate agent who is selling an apartment in the building. The location of the apartment may indicate that the environment is unknown and potentially dangerous territory for the real estate agent. Based on the particular apartment building, a realtor company that the real estate agent works for may be selected as a recipient.

In some embodiments, particular triggers may be associated with particular recipients. For example, a trigger that is a particular entity (e.g., a dog), may be associated with a particular recipient (e.g., a particular social media platform). When the dog is detected as a trigger, a stream of the live video featuring the dog may be provided to the particular social media platform.

In some embodiments, selection of the recipient from the set may also be based on other considerations apart from the association of the recipient with the trigger that is detected, such as a priority or other characteristics. For example, an utterance (e.g., "GET HELP") may be detected as a trigger. A characteristic of "emergency services" may be associated with a recipient that is a law enforcement agency. When "GET HELP!" is detected in the environment, the law enforcement agency may be selected as a recipient to receive the live video stream based on the law enforcement agency having the characteristic of "emergency services."

In some embodiments, at least one recipient may be selected based on a priority of the recipient. For example, a particular priority may be associated with a particular recipient. The recipient may be selected based on the recipient having a priority higher than at least one other recipient in the recipient set. In some embodiments, a priority may be a numerical value. In a further example, the particular recipient may be selected based on the recipient having a priority that exceeds a priority threshold. For example, a hostile person (e.g., an image of a known face in the live video) may be detected as a trigger in the environment. Based on the hostile person being detected, a recipient that is a law enforcement agency may be selected, where the law enforcement agency has the highest priority of all recipients in the set. In some embodiments, individual recipients of a recipient set may be associated with one or more priorities. In some embodiments, different triggers are associated with different priorities for various recipients. For example, a first trigger may be associated with a first priority for a particular recipient, whereas a second trigger may be associated with a second priority for the same recipient.

In some embodiments, a recipient may be selected based on a characteristic of recipient. In some embodiments, a characteristic may be a category, a designation, a trait, or other characteristic. For example, a particular recipient may be associated with a particular characteristic, and the particular recipient may be selected based on the recipient having the particular characteristic. For example, a recipient may be associated with the characteristic of "spouse," and another recipient may be associated with the characteristic of "emergency rescue." If a high impact motion is detected as a trigger (e.g., via a motion sensor of the user device), it may indicate that a car accident may have occurred. Correspondingly, a recipient set associated with accidents may be selected. The "spouse" recipient and the "emergency rescue" recipient may be selected from that set to receive a video stream of the environment, based on the high impact motion.

In some embodiments, predictions of recipients or recipient set may be provided by a prediction model 214, similarly to the prediction of triggers as described herein. In some embodiments, priorities, categories, or other characteristics of the recipient set may be provided to the prediction model 214 as feedback for the prediction of the recipient set. In some embodiments, priorities and other characteristics of recipients or recipient sets may be stored in storage platform 208 and provided to the prediction model 214 as feedback for the prediction of recipients or recipient sets. In some embodiments, apart from relying on the detected trigger(s), or priorities or other characteristics of the recipient set, the recipient set may be determined based on previously stored priorities and other characteristics of recipients or recipient sets that were determined for previously detected triggers. In some embodiments, the provision of feedback (e.g., priorities of recipients, characteristics of recipients, detected triggers, etc.) to teach the prediction model 214 to predict recipients or recipient sets is performed by feedback subsystem 118. In some embodiments, feedback information may be stored in a prediction database 132.

In some embodiments, based on the trigger and the selection of at least one recipient or recipient set, a live video stream representative of the environment may be provided to the selected recipient(s) or the recipient set(s). In some embodiments, the provision of the live video stream is performed by the video streaming subsystem 116. In some embodiments, the live video stream may be stored with a selected recipient, or on storage platform 208. For example, a live video stream may be provided to a recipient that is a social media platform, which may store and host the live video.

In some embodiments, if a recipient is unavailable to receive a live video stream (e.g., the recipient rejects the live video stream, the recipient is not located near a device that the recipient may receive the stream on, the recipient is detected to be driving or in other circumstances in which the recipient is deemed unavailable, etc.), at least one additional recipient may be selected to receive the live video stream. In some embodiments, where the recipient has the highest priority in the recipient set, the additional recipient may be at least one other recipient of the same recipient set with the next highest priority in the set. For example, the recipients in the recipient set may be cycled through in order of highest to lowest priority until at least one recipient is able to receive the live video stream. In some embodiments, the additional recipient may have a priority that exceeds a particular threshold priority. In some embodiments, if none of the recipients of a selected recipient set are available to receive the live video stream, at least one other recipient from another recipient set may be selected.

In some embodiments, based on the trigger and the selection of at least one recipient or recipient set, one or more actions may be performed. In some embodiments, the actions may be associated with the trigger, or a recipient set. For example, an utterance, "HELP !" may be detected as a trigger in the environment. The utterance "HELP!" may be associated with the performance of an action to seek immediate aid, or a characteristic of "Emergency Assistance" (e.g., a characteristic associated with certain recipients or recipient sets). Based on the utterance, an action performed in response to the trigger "HELP!" may include a request for help from a recipient or recipient set with the characteristic of "Emergency Assistance." For example, when "HELP!" is detected, actions taken may include dialing 911, or sending a communication and a live video stream to an emergency rescue service within a certain distance of the location of the user device.

In some embodiments, an action may be performed without relying on a recipient set or a recipient. For example, an action may include performing an action related to an application platform 212 based on the trigger. In some embodiments, an application platform 212 may be an application or program that is installed on the user device or other third-party application or program, such as a safety application or a transit application. For example, the application platform may be caused to perform a certain action based on the detection of a certain trigger. For example, a temperature change may be detected as a trigger that indicates that the user of a device has stepped into an unfamiliar building. One or more actions may be associated with the temperature change, including providing a live video stream to a storage (e.g., storage platform 208) or sending a request or command to a safety app (e.g., application platform 212) to broadcast, via the safety app, that the user of the user device may be in an unsafe situation. In an example, an oral communication that is a statement saying "goodbye" may be detected as a trigger, indicating that the user of the user device may require transportation in the near future. The actions taken in response to the trigger may then include sending a request or command to a transit app to request that a car be sent to the user's location. In a further example, an utterance of "HELP!" may be detected as a trigger, indicating that the user of the user device needs help. The actions taken in response to the trigger may then include sending a command to a safety app to call the police to the location indicated by the app.

In some embodiments, certain triggers (e.g., particular locations) may be associated with certain actions. For example, a location that is designated as a sensitive location (e.g., a bathroom or other private area) may be detected as a trigger. This trigger may be associated with an action of terminating any ongoing live video streams. In some embodiments, a trigger may be inflammatory or unsuitable for some viewers. For example, an act of violence, gore, or sexual content may be detected as a trigger (e.g., via image recognition processing). This trigger may be associated with an action of filtering any ongoing live video streams with a modification to the live video (e.g., such as pausing, pixelating, muting, or censoring the live video) before the live video is streamed to a recipient, or not streaming the live video to any recipients.

Example Flowcharts

Figure 3:
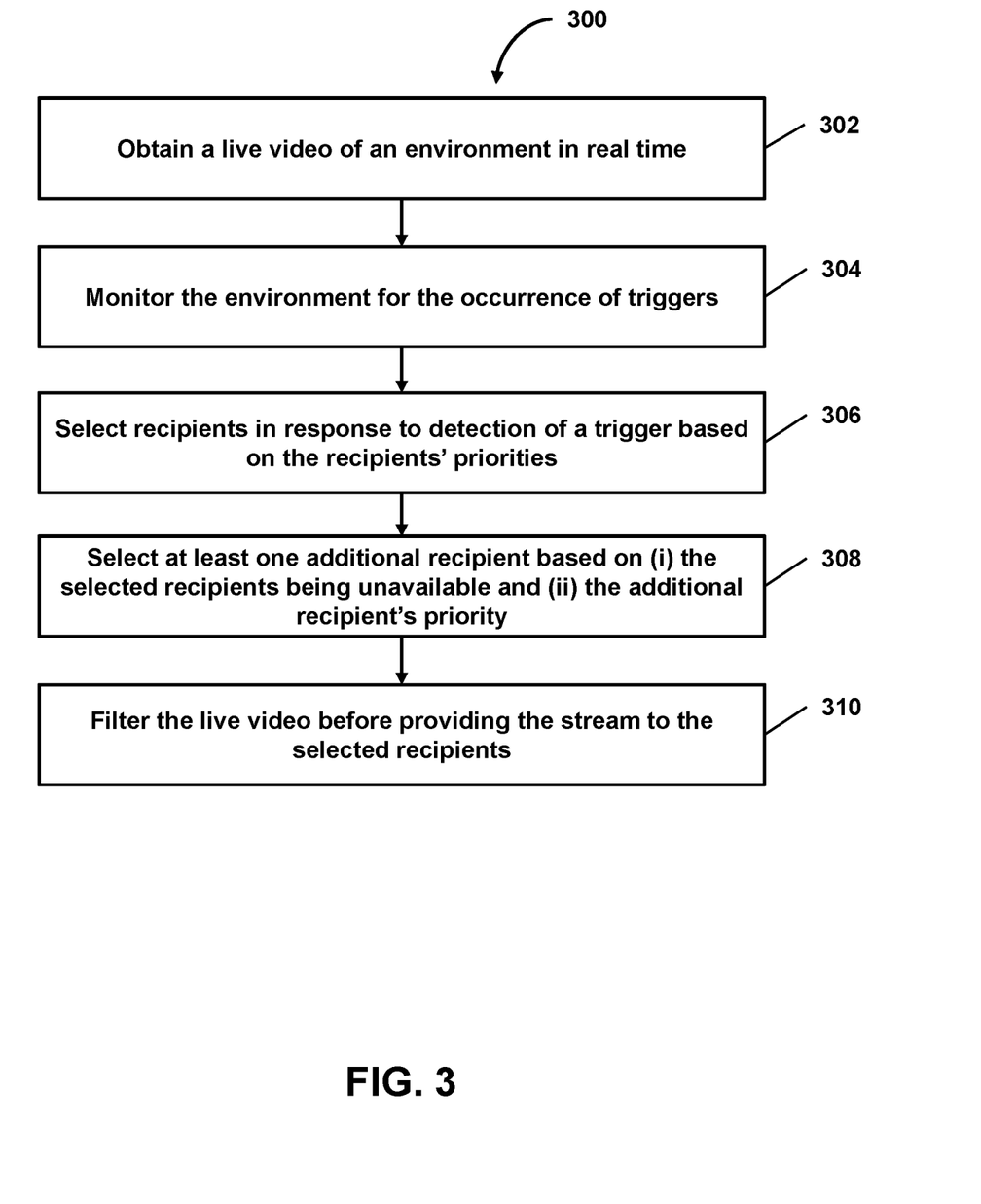
FIG. 3 shows a flowchart of a method of providing a live video stream to one or more recipients, in accordance with one or more embodiments.
Figure 4:
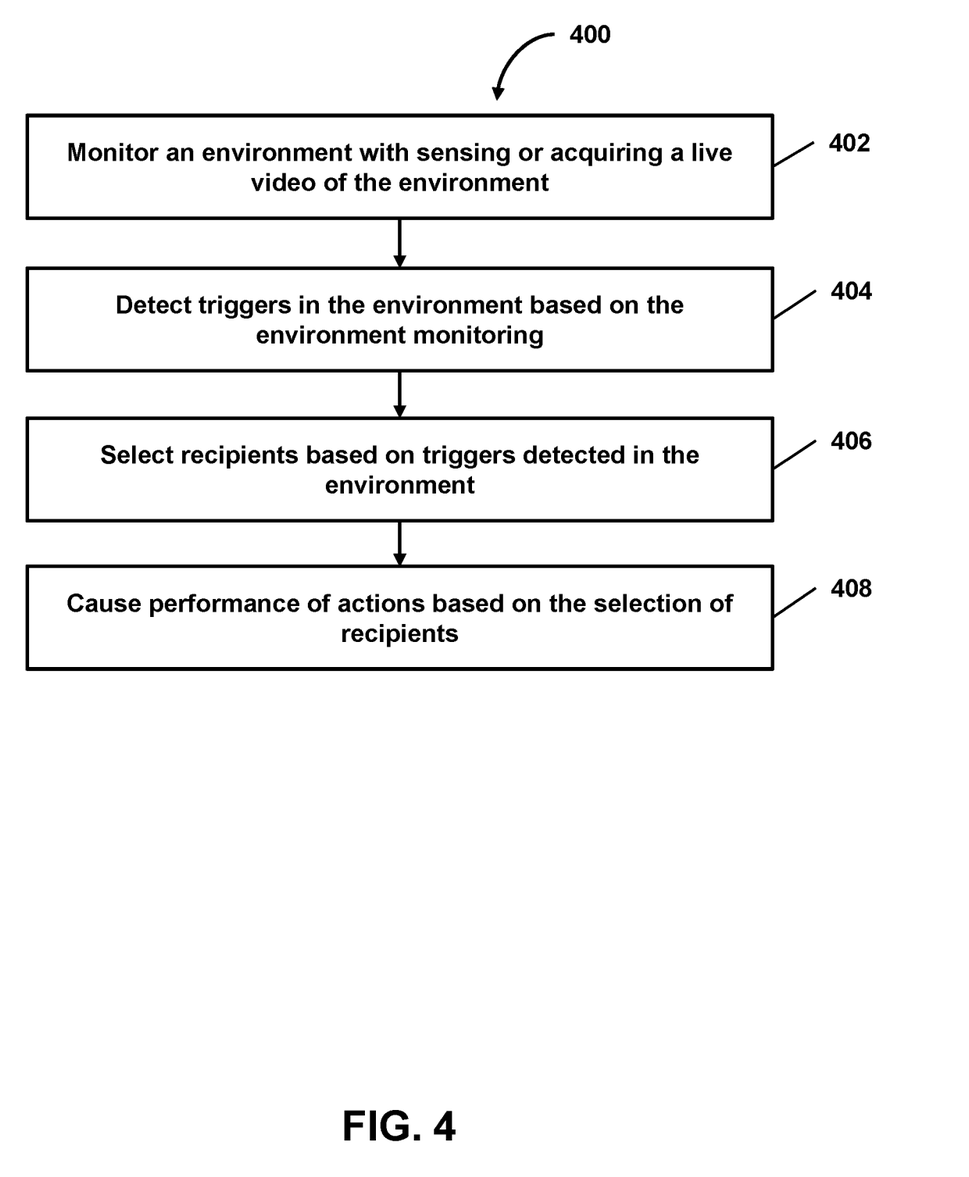
FIG. 4 shows a flowchart of a method of performing one or more actions based on one or more triggers detected in an environment, in accordance with one or more embodiments.

FIGS. 3-4 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 3 shows a flowchart of a method 300 of providing a live video stream of an environment to one or more recipients based on triggers detected in the environment, in accordance with one or more embodiments.

In an operation 302, a live video may be obtained in real time of an environment. In some embodiments, the live video may include images and audio that represent occurrences in the environment. As an example, the occurrences in the environment may include triggers in the live video stream. For example, a device may be glasses, a headset, a mobile device, or other device. Operation 302 may be performed by a device that is the same as or similar to client device 100, in accordance with one or more embodiments. In one or more embodiments, operation 302 may also be performed by a subsystem that is the same as or similar to environment monitoring subsystem 112.

In an operation 304, the environment may be monitored for the occurrence of triggers. As an example, the environment may be monitored via a camera or other optical sensor, via a microphone or other sound sensor, via physical sensing, etc. As a further example, the environment may be monitored via the images and audio of the live video of the environment. In some embodiments, image recognition or audio recognition may be performed on the live video. In some embodiments, the triggers in the live video stream depicting the environment may be a person, an object, a landmark, voice print, voice patterns, an utterance, volume of sounds, or other triggers). For example, a British accent may be detected as a trigger in the live video via audio recognition. In some embodiments, the triggers detected by sensing may include a person, an object, a landmark, speech patterns, voice prints, sound volume, utterances, temperature (e.g., a change in temperature), light (e.g., brightness levels), location (e.g., a landmark, a building, a particular address etc.), or other triggers. For example, a loud boom (e.g., a high volume of sound) may be detected as a trigger in the live video via audio recognition. Operation 304 may be performed by a subsystem that is the same as or similar to environment monitoring subsystem 112, in accordance with one or more embodiments.

In an operation 306, one or more recipients may be selected in response to detection of a trigger based on the recipients' priorities. For example, the recipient may be associated with a priority. The priority may be a numerical value. The recipient may be then selected to receive a live video stream, based on the priority of the recipient being higher than at least one other recipient of the recipient set. In a further example, the recipient may be selected based on the priority of the recipient exceeding a priority threshold. In some embodiments, the recipients may be associated with different priorities depending on the trigger. For example, a recipient may have a higher priority for a first trigger and a lower priority for a second trigger, with respect to the priority of at least one other recipient of the recipient set. Operation 306 may be performed by a subsystem that is the same as or similar to recipient determination subsystem 114, in accordance with one or more embodiments.

In an operation 308, if the recipient is unavailable to receive the live video stream, at least one additional recipient of the recipient set may be selected in response to the detection of the trigger based on the recipients' priorities. In some embodiments, the live video stream may be provided to the additional recipient in the same recipient set that has a priority that is the next highest to the initial recipient's priority. For example, the live video stream may be provided to additional recipients in the recipient set, in order of high to low priority, until at least one recipient of the recipient set is available to receive the live video stream. In some embodiments, the live video stream may be provided to the additional recipient in the same recipient set that exceeds a priority threshold. In some embodiments, if no recipient is available to receive the video, an additional recipient set may be selected, and the live video stream may be provided to at least one additional recipient of the additional recipient set. For example, if no additional recipient in a first recipient set is available to receive the live video stream after every recipient has been provided the stream in order of their priorities, a second recipient set is selected. The live video stream is then provided to additional recipients in the second recipient set in order of their priorities, from high to low priorities, until at least one additional recipient in the second recipient set is available to receive the live video stream. Operation 308 may be performed by a subsystem that is the same as or similar to recipient determination subsystem 114, in accordance with one or more embodiments.

In an operation 310, the live video is filtered before the live video stream is provided to recipients. In some embodiments, filtering the live video includes performing a modification of the images or audio of the video. In some embodiments, the live video may be filtered before the video is streamed to a recipient. In some embodiments, the type of modification may be determined based on information detected from the environment related to the trigger or the recipients. For example, a trigger may be sensitive, inappropriate, or not suitable for some recipients—a hostile person may be detected as a trigger in the environment, and the live video may depict violent acts. If the recipient set selected includes recipients that are sensitive to violence, the modification of the video may include pixelating the video or muting the audio of the live video so as to avoid showing the violent acts depicted in the live video stream to the recipients, or terminating the stream of the live video to the recipients until the violence is detected to have ceased. Operation 310 may be performed by a subsystem that is the same as or similar to video streaming subsystem 116, in accordance with one or more embodiments.

FIG. 4 shows a flowchart of a method 400 of facilitating the performance of actions (e.g., streaming a live video, calling for immediate rescue, etc.) in response to triggers detected in the environment.

In an operation 402, an environment may be monitored. In some embodiments, the environment is monitored by performing sensing procedures, such as optical sensing, physical sensing, motion sensing, heat sensing, or other types of sensing. For example, the environment may be monitored for location, temperature, motion, light, a person, object, or other images, or utterances, voice prints, speech patterns, sound volume, or other sounds. In some embodiments, the environment may be monitored by performing image recognition or audio recognition on a live video, where the live video may be representative of the environment. For example, the environment depicted in the live video may be monitored for images, such as a person or object, or sounds, such as utterances. Operation 402 may be performed by a subsystem that is the same as or similar to environment monitoring subsystem 112, in accordance with one or more embodiments.

In an operation 404, triggers may be detected from the environment based on the monitoring of the environment. The monitoring may be continuous or activated (e.g., via a prompt or command by the user of the user device). As an example, the triggers may be related to information from the environment. In some embodiments, triggers may include, for example, a change in temperature, occurrence of fast motion, changes in brightness, the occurrence of a particular voice print or speech pattern, the user device being in a particular location, sound exceeding a certain volume, an image of a particular person or object, or other characteristics of the environment. For example, a trigger may be a particular hostile person, or the voice print of the hostile person, and indicate that the hostile person is present in the environment. In some embodiments, the triggers may be designated by a user of the user device. In some embodiments, a trigger may be associated with one or more actions to be performed in response to the trigger being detected. For example, a trigger (e.g., a particular hostile person) may be associated with an action to stream a live video of the environment featuring the hostile person to a recipient set (e.g., including law enforcement agencies), and to send a request for immediate assistance (e.g., for the law enforcement agencies to respond). In a further example, a trigger may be a location that has been designated a sensitive area (e.g., a private space). The private space trigger may be associated with specific actions. For example, a private space that is a bathroom may be detected as a trigger (e.g., location, an increase in humidity, the sound of running water in a closed space, objects recognized as a bathtub etc.). Correspondingly, an action may be performed that includes immediately terminating any ongoing streams of a live video of the environment, or censoring the live video before it is streamed to a recipient. Operation 404 may be performed by a subsystem that is the same as or similar to environment monitoring subsystem 112, in accordance with one or more embodiments.

In an operation 406, recipients or a recipient set may be selected. In some embodiments, the recipient set may include persons, law enforcement agencies, storage platforms, or other recipients. In some embodiments, the determination of the recipients may be based on the trigger that is detected in the environment. For example, a dangerous object, a firearm, may be detected in the environment as a trigger. Based on the firearm, the determination of the recipient set may include a recipient set that are law enforcement agencies. In some embodiments, the determination of a recipient may be based on a characteristic of the recipient, such as a priority, a trait, a category etc. For example, a recipient may be determined based on the recipient's priority being higher than the priority of at least one other recipient in the recipient set. In a further example, the recipient may be determined based on the recipient being categorized as a "cat fan," where the trigger (e.g., a particular cat) is associated with the "cat fan" category." Operation 406 may be performed by a subsystem that is the same as or similar to recipient determination subsystem 114, in accordance with one or more embodiments.

In an operation 408, based on the selection of a recipient or a recipient set and the detected trigger, one or more actions may be performed. In some embodiments, the actions may be related to the recipient set. In some embodiments, the actions may include providing a stream of a live video of the environment, providing a communication, storing a record of the live video, or other actions. In some embodiments, the actions may be associated with the trigger. As an example, a hostile person may be detected as a trigger in the environment. The trigger, the hostile person, may be associated with an action to stream a live video of the environment to a family member and an action to send data to and request immediate assistance from a list of law enforcement agencies. Based on the hostile person being detected, one recipient may be determined to be a spouse and another recipient may be determined to be a law enforcement agency. The live video of the environment may be streamed to the spouse. Immediate assistance may be requested from the law enforcement agency, and data related to the location of the user may be sent with the request for assistance. Operation 408 may be performed by a subsystem that is the same as or similar to video streaming subsystem 116, in accordance with one or more embodiments.

In some embodiments, the various computers and subsystems illustrated in FIG. 1 may include one or more computing devices that are programmed to perform the functions described herein. The computing devices may include one or more electronic storages (e.g., prediction database(s) 132, which may include training data database (s) 134, model database(s) 136, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-118 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-118 described herein is for illustrative purposes, and is not intended to be limiting, as any of subsystems 112-118 may provide more or less functionality than is described. For example, one or more of subsystems 112-118 may be eliminated, and some or all of its functionality may be provided by other ones of subsystems 112-118. As another example, additional subsystems may be programmed to perform some or all of the functionality attributed herein to one of subsystems 112-118.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: monitoring an environment; detecting occurrence of one or more triggers in an environment; and performing one or more actions based on the one or more triggers.
2. The method of embodiment 1, wherein the one or more triggers comprise light, motion, temperature, a person, object, landmark, a voice print, a speech pattern, or an utterance.
3. The method of any of embodiments 1-2, wherein the one or more actions comprises providing a recipient with a live video stream of the environment, sending data, a request, data or communications to the recipient, or storing a live video stream with the recipient.
4. The method of any of embodiments 1-3, wherein the monitoring of the environment is performed by a device located in the environment, the device comprising a mobile device or a wearable device.
5. The method of any of embodiments 1-4, wherein the monitoring of the environment is performed continuously or initiated by a prompt.
6. The method of any of embodiments 1-5, wherein the one or more triggers are associated with the one or more actions.
7. The method of any of embodiments 1-6, wherein the one or more triggers is detected by performing optical sensing, motion sensing, heat sensing, humidity sensing, image recognition, audio recognition, or location determination to detect the one or more triggers.
8. The method of any of embodiments 1-7, further comprising: obtaining a live video representative of the environment.
9. The method of embodiment 8, wherein the one or more triggers is detected by performing image recognition or audio recognition on the images or audio in the live video to detect the one or more triggers.
10. The method of any of embodiments 1-9, further comprising: selecting one or more lists of recipients based on the one or more triggers detected, the one or more lists of recipients having a priority higher than at least one other list of recipients, or the one or more lists of recipients having a priority exceeding a priority threshold.
11. The method of embodiment 10, further comprising: selecting one or more recipients from the selected one or more lists of recipients based on the one or more triggers detected, that have a priority higher than at least one other list of recipients or a priority exceeding a priority threshold.
12. The method of any of embodiments 1-9, further comprising: selecting one or more recipients based on an association of the one or more lists of recipients with one or more characteristics.
13. The method of any of embodiments 10-12, further comprising: selecting one or more recipients from the selected one or more lists of recipients based on an association of the selected one or more lists with one or more characteristics of the one or more recipients.
14. The method of any of embodiments 10-13, wherein the recipients comprises a person, a law enforcement agency, a platform, a network, or other entity.
15. The method of any of embodiments 1-14, wherein the one or more triggers comprises a location that is designated as sensitive, and the one or more actions are associated with the location designated as sensitive, the one or more actions comprising terminating video streams.
16. The method of any of embodiments 10-15, further comprising: selecting a filter associated with the selected one or more lists of recipients or the one or more triggers detected; and applying, prior to streaming the live video to a first recipient, the filter to the live video to modify the stream of the live video such that the stream of the live video comprises the stream of the modified live video.
17. The method of any of embodiments 10-16, further comprising: selecting the one or more lists of recipients or the at least one recipient, based on the one or more triggers detected or at least one characteristic of the one or more lists of recipients or the at least one recipient, wherein the at least one characteristic comprises a category, a designation, or a trait associated with the one or more lists of recipients or the at least one recipient.
18. The method of any of embodiments 10-17, wherein if a selected one or more recipients or one or more lists of recipients are unavailable to receive a stream of the live video, at least one other recipient or other list is selected to receive the stream of the live video, based on the at least one other recipient or other list having a priority that is the next highest to the priority of the selected one or more recipients or one or more lists of recipients.
19. A tangible, non-transitory, machine-readable medium storing instructions that, when executed by a data processing apparatus, cause the data processing apparatus to perform operations comprising those of any of embodiments 1-18.
20. A system comprising: one or more processors; and memory storing instructions that, when executed by the processors, cause the processors to effectuate operations comprising those of any of embodiments 1-18.

What is claimed is:

1. A method for providing a stream of a live video to a trigger-associated recipient, the method comprising:
    obtaining, by one or more processors, via a user device, a live video representative of an environment in which the user device is located;
    monitoring, by one or more processors, the environment for occurrence of one or more triggers;
    determining, by one or more processors, occurrence of a trigger of the one or more triggers based on the monitoring;
    selecting, by one or more processors, a set of recipients associated with the trigger of the one or more triggers, the set of recipients comprising recipients being selected as candidates to receive a stream of the live video based on the trigger;
    initiating, by one or more processors, streaming of the live video to a first recipient of the set of recipients based on the first recipient having a higher priority than a second recipient of the set of recipients; and
    streaming, by one or more processors, the live video to the second recipient of the set of recipients based on (1) the second recipient having a higher priority than one or more other recipients of the set of recipients and (2) the first recipient being unavailable to receive the stream of the live video.

2. The method of claim 1, further comprising:
selecting, by one or more processors, a filter associated with the set of recipients; and
applying, by one or more processors, prior to streaming the live video to the first recipient, the filter associated with the set of recipients to the live video to modify the stream of the live video such that the stream of the live video comprises the modified stream.

3. The method of claim 1, wherein the trigger of the one or more triggers comprises a spoken term, a voice print, a location, a temperature change, a motion, a person, an amount of time, a speech pattern, or an object.

4. The method of claim 1, wherein the monitoring of the environment comprises:
performing, by one or more processors, image recognition or natural language processing on a feature of the live video to determine the occurrence of the trigger, the feature comprising a person, an object, or speech.

5. The method of claim 1, wherein the monitoring of the environment comprises:
performing, by one or more processors, detection of a property of the environment to determine the occurrence of the trigger, the property comprising a temperature, a sound, a light, a location, a time, or a movement.

6. The method of claim 1, further comprising:
determining, by one or more processors, occurrence of a stop trigger of the one or more triggers based on the monitoring, wherein the stop trigger is associated with a user-designated sensitive location; and
terminating, by one or more processors, the stream of the live video to the recipients of the set of recipients based on the stop trigger.

7. The method of claim 1, further comprising:
streaming, by one or more processors, the live video to multiple recipients of the set of recipients based on the multiple recipients having a characteristic associated with the trigger, the characteristic comprising a category assigned to the recipients or availability of the recipients to receive the stream of the live video.

8. The method of claim 1, further comprising:
streaming, by one or more processors, the live video to multiple recipients of the set of recipients based on (1) the multiple recipients of the set of recipients having a specified priority and (2) the multiple recipients of the set of recipients having a priority satisfying a priority threshold.

9. A non-transitory computer-readable media comprising instructions that, when executed by one or more processors, cause operations comprising:
obtaining a live video representative of an environment;
monitoring the environment for occurrence of one or more triggers;
determining occurrence of a trigger of the one or more triggers based on the monitoring;
selecting a set of recipients associated with the trigger of the one or more triggers, the set of recipients comprising recipients being selected as candidates to receive a stream of the live video based on the trigger;
initiating streaming of the live video to a first recipient of the set of recipients based on the first recipient having a higher priority than a second recipient of the set of recipients; and streaming the live video to the second recipient of the set of recipients based on (1) the second recipient having a higher priority than one or more other recipients of the set of recipients and (2) the first recipient being unavailable to receive the stream of the live video.

10. The media of claim 9, the operations further comprising:
selecting a filter associated with the set of recipients; and
applying, prior to streaming the live video to the first recipient, the filter associated with the set of recipients to the live video to modify the stream of the live video such that the stream of the live video comprises the stream of the modified stream.

11. The media of claim 9, wherein the trigger of the one or more triggers comprises a spoken term, a voice print, a location, a temperature change, a motion, a person, an amount of time, a speech pattern, or an object.

12. The media of claim 9, wherein the monitoring of the environment comprises:
performing image recognition or natural language processing on a feature of the live video to determine the occurrence of the trigger, the feature comprising a person, an object, or speech.

13. The media of claim 9, the operations further comprising:
determining occurrence of a stop trigger of the one or more triggers based on the monitoring, wherein the stop trigger is associated with a user-designated sensitive location; and
terminating the stream of the live video to the recipients of the set of recipients based on the stop trigger.

14. The media of claim 9, the operations further comprising:
streaming the live video to multiple recipients of the set of recipients based on the multiple recipients having a characteristic associated with the trigger, the characteristic comprising a category assigned to the recipients or availability of the recipients to receive the stream of the live video.

15. The media of claim 9, the operations further comprising:
streaming the live video to multiple recipients of the set of recipients based on (1) the multiple recipients of the set of recipients having a specified priority and (2) the multiple recipients of the set of recipients having a priority satisfying a priority threshold.

16. A system comprising one or more processors programmed with instructions that, when executed, cause the system to:
obtain a live video representative of an environment via a user device;
monitor the environment for occurrence of one or more triggers;
determine occurrence of a trigger of the one or more triggers based on the monitoring;
select one or more recipients based on the trigger;
perform one or more actions associated with the trigger and at least one recipient of the one or more recipients;
determine occurrence of another trigger of the one or more triggers, wherein the other trigger is associated with a sensitive location; and
perform one or more other actions associated with the other trigger and the at least one recipient of the one or more recipients.

17. The system of claim 16, wherein the trigger of the one or more triggers comprises a spoken term, a voice print, a location, a temperature change, a motion, a person, an amount of time, a speech pattern, or an object.

18. The system of claim 16, wherein the one or more actions or the one or more other actions comprise streaming the live video to the at least one recipient or modifying the live video before streaming the live video to the one or more recipients.

19. The system of claim 16, wherein the one or more actions comprises streaming of the live video, and wherein the one or more other actions comprises terminating the streaming of the live video based on a determination that the user device is in the sensitive location.

20. The system of claim 16, wherein the monitoring of the environment comprises:
- performing image recognition or natural language processing on a feature of the live video to determine the occurrence of the trigger, the feature comprising a person, an object, or speech; and
- performing detection of a property of the environment to determine the occurrence of the trigger, the property comprising a temperature, a sound, a light, a location, a time, or a movement.

* * * * *